United States Patent [19]

Hashimoto et al.

[11] Patent Number: 4,681,816

[45] Date of Patent: Jul. 21, 1987

[54] COMPOSITE LAMINATES COMPRISING A METALLIC SUBSTRATE AND VIBRATION DAMPER

[75] Inventors: Mikio Hashimoto, Hiroshima; Yoshinari Nakata; Hitoshi Koga, both of Yamaguchi, all of Japan

[73] Assignee: Mitsui Petrochemical Industries, Ltd., Tokyo, Japan

[21] Appl. No.: 748,045

[22] Filed: Jun. 24, 1985

[30] Foreign Application Priority Data

Jun. 26, 1984 [JP] Japan ................................ 59-132605

[51] Int. Cl.$^4$ ...................... B32B 15/08; C08L 63/00; E04B 1/84
[52] U.S. Cl. .................................... 428/463; 428/519; 428/520; 428/324; 428/330; 260/DIG. 46; 252/62; 525/122; 181/294
[58] Field of Search ............................... 428/463, 520; 260/DIG. 46; 252/62

[56] References Cited

U.S. PATENT DOCUMENTS

| | | | |
|---|---|---|---|
| 3,547,759 | 12/1970 | Oberst et al. | 428/463 X |
| 3,547,760 | 12/1970 | Oberst et al. | 428/463 X |
| 3,562,090 | 2/1971 | Oberst et al. | 428/463 X |
| 3,562,091 | 2/1971 | Oberst et al. | 428/463 X |
| 3,562,235 | 2/1971 | Ryan | 428/463 X |

*Primary Examiner*—P. C. Ives
*Attorney, Agent, or Firm*—Wenderoth, Lind & Ponack

[57] ABSTRACT

Composite laminates such as metal plate/vibration damper/metal plate, metal plate/vibration damper/metal plate/vibration damper, metal plate/vibration damper/metal plate/vibration damper/metal plate are disclosed. The vibration damper is composed of ethylene-(meth)acrylic acid salt copolymers or its modified products having a specific melting point and a particular heat of fusion. The composite laminate having at least one vibration damper exhibits excellent vibration damping performance, particularly at high temperatures.

9 Claims, No Drawings

COMPOSITE LAMINATES COMPRISING A METALLIC SUBSTRATE AND VIBRATION DAMPER

BACKGROUND OF THE INVENTION

This invention relates to a composite laminate, and more particularly to a composite laminate for the vibration damping which has excellent vibration damping performance, particularly at high temperatures.

Heretofore, in order to inhibit or prevent the noise or vibration generated from a variety of mechanical and electrical devices, structures and the like, there have been proposed or commercially used composite laminates for the vibration damping wherein as a vibration damper, a resin or resin composition having viscoelasticity is interposed between substrates such as metal plates, and wherein the internal friction due to the shearing deformation of the vibration damper described above is utilized to improve the vibration damping performance.

Known resins for a vibration damper in such a composite laminate are polyethylene and polypropylene which are representative thermoplastic resins. Further, Japanese Patent Laid-Open Pub. Nos. 43251/1979 and 43252/1979 disclose compositions for a vibration damper containing polyisobutylene as a main component, dienic hydrocarbon polymers or cyclic olefinic polymers, and inorganic fillers. Furthermore, Japanese Patent Laid-Open Pub. No. 34949/1982 describes a composite laminate wherein a vibration damper comprising an ethylene-vinyl acetate copolymer is hot-pressed between steel plates. Moreover, Japanese Patent Publication No. 12451/1964 teaches a polymer composition for a vibration damper wherein the polymer composition comprises a heterogeneous amorphous copolymer of ethylene or straight chain α-olefins containing from 3 to 10 carbon atoms and acrylic acid or methacrylic acid.

However, the composite laminates using such prior art vibration dampers are insufficient in its vibration damping performance. Particularly, the vibration damping performance at a high temperature of at least 80° C. is inferior. Accordingly, it is not preferable to use the prior art composite laminates as, for example, a composite laminate for the vibration damping at high temperatures, at the periphery of high temperature members such as engines.

SUMMARY OF THE INVENTION

It is an object of the present invention to overcome the problems of the prior art composite laminates for the vibration damping.

It is a further object of the present invention to provide a composite laminate having excellent vibration damping performance, particularly at high temperatures.

A metal composite laminate according to the present invention comprises at least one substrate and at least one vibration damper laminated thereon, said vibration damper being composed of at least one copolymer selected from the group consisting of ethylene-(meth)acrylic acid salt copolymers and modified products thereof, the melting point of the copolymer being in the range of from 60° to 90° C. and the heat of fusion thereof being at least 20 joules per gram as determined by means of a differential scanning calorimeter.

DETAILED DESCRIPTION OF THE INVENTION

In the composite laminate for the vibration damping according to the present invention, at least one copolymer selected from the group consisting of ethylene-(meth)acrylic acid salt copolymers and modified products thereof is used as a vibration damper which is laminated on at least one substrate.

The ethylene-(meth)acrylic acid salt copolymers include copolymers of ethylene and sodium, potassium or zinc (meth)acrylate. It is preferable that the content of (meth)acrylic acid salt in the copolymers be usually in the range of from 15% to 40% by weight.

It is necessary that the ethylene-(meth)acrylic acid salt copolymers described above have the following characteristics: the melting point of the copolymer is being in the range of from 60° to 90° C., and the heat fusion thereof is at least 20 joules per gram as determined by means of a differential scanning calorimeter. It is particularly preferable that the melting point described above be in the range of from 70° to 90° C., and that the heat of fusion be in the range of from 20 to 40 joules per gram. If the melting point of such copolymers is above 90° C. or below 60° C., the vibration damping performance of the composite laminate at high temperatures is insufficient. If the heat of fusion is less than 20 joules per gram, such a vibration damping performance is insufficient.

In order to ensure that the composite laminate according to the present invention has excellent vibration damping performance particularly at high temperatures, it is desirable that the ethylene-(meth)acrylic acid salt copolymers have the following characteristics: a tensile strength at room temperature is at least 70 kg/cm$^2$, preferably from 100 to 300 kg/cm$^2$; a melt flow rate (ASTM D 1238, condition E) is no more than 50 grams per 10 minutes, preferably from 0.1 to 3 grams per 10 minutes; and a loss factor (tan δ) at 80° C. is at least 0.15, preferably from 0.2 to 0.8. By the term loss factor is meant tan δ at a frequency of 110 Hz and a dynamic strain of $1.6 \times 10^{-3}$ cm in a Vibron method.

For the composite laminate according to the present invention, modified products of the above ethylene-(meth) acrylic acid salt copolymer can be used as the vibration damper. A variety of additives can also be optionally incorporated into the ethylene-(meth)acrylic acid salt copolymer. Examples of modified products of the ethylene-(meth)acrylic acid salt copolymers described above are those modified products wherein unsaturated carboxylic acids such as acrylic acid, methacrylic acid, methyl methacrylate, maleic acid, maleic anhydride, dimethyl maleate, itaconic acid, itaconic anhydride, citraconic acid, bicyclo [2.2.1] hept -2-ene-5,6-dicarboxylic acid and its anhydride; or derivatives of the unsaturated carboxylic acids such as acid anhydrides, salts and esters are grafted to the ethylene-(meth)acrylic acid salt copolymer. The content of the above unsaturated carboxylic acid or its derivative component in these modified products of ethylene-(meth)acrylic acid salt copolymers is preferably in the range of from 0.1% to 5% by weight based on the weight of the modified product.

The vibration damper comprising the ethylene-(meth) acrylic acid salt copolymer described above may also contain modified polyolefins in order to improve, for example, the adhesion of the vibration damper to substrate metals. Examples of such modified polyolefins which can be incorporated into the vibration damper are copolymers obtained by grafting the unsaturated carboxylic acids or its derivatives as described above to polyolefins. Examples of the polyolefins suitable for use herein are homopolymers of monomers such as ethylene, propylene, 1-butene, 1-pentene, 4-methyl-1-pentene, 1-hexene, 1-octene, 1-decene, 1-dodecene, 1-tetradecene, 1-hexadecene, and 1-octadecene; and copolymers thereof. The graft proportion of the above unsaturated carboxylic acid or its derivative component in these modified polyolefins is usually in the range of from 0.1 to 5 parts by weight, preferably from 0.2 to 3 parts by weight based on 100 parts by weight of the polyolefin described above. Further, polymers such as ethylene-propylene-diene copolymer, polyisobutylene, butyl rubber, chloroprene rubber and polystyrene can be optionally incorporated. The amount of the modified polyolefins or polymers as described above is usually in the range of from 10 to 30 parts by weight based on 100 parts by weight of the ethylene-(meth)acrylic acid salt copolymer.

Further, in the composite laminate according to the present invention, an inorganic filler can be incorporated into the ethylene-(meth)acrylic acid salt copolymer in order to improve the vibration damping properties and rigidity of the vibration damper. Examples of such inorganic fillers include graphite, mica, titanium dioxide, zinc white, lead powders, clays, calcium carbonate, magnesium carbonate, carbon black, and the like. The amount of such inorganic fillers used is usually in the range of from 10 to 400 parts by weight, preferably from 10 to 200 parts by weight based on 100 parts by weight of the ethylene-(meth)acrylic acid salt copolymer described above.

Furthermore, additives such as heat stabilizers, antioxidants; ultraviolet absorbers, antistatic agents, and lubricants can be optionally incorporated into the vibration damper comprising the ethylene-(meth)acrylic acid salt copolymer as described above.

The composite laminate according to the present invention is one obtained by laminating at least one vibration damper comprising the ethylene-(meth)acrylic acid salt copolymers, its modified products or compositions having various additives incorporated therein, on at least one substrate, typically at least one metal plate. The structure and shape of such composite laminates are not restricted. Examples of the structure of the laminates include composite laminates such as metal plate/vibration damper/metal plate, metal plate/vibration damper/metal plate/vibration damper, and metal plate/vibration damper/metal plate/vibration damper/metal plate. It is unnecessary that such composite laminates be planar. The laminates as described above may be tubular or corrugated.

While the thickness of the vibration damper comprising the ethylene-(meth)acrylic acid salt copolymer as described above is not restricted in the composite laminate according to the present invention, the thickness of the vibration damper is usually from 0.05 to 0.5 mm, preferably from 0.2 to 0.5 mm. While the thickness of the substrate is not restricted, the thickness of the substrate is usually in the range of from 0.1 to 2 mm, preferably from 0.2 to 0.5 mm. Representative examples of the substrates described above include plates of metals such as iron, steel, copper, aluminum, stainless steel, and brass. The substrates are not limited thereto.

The composite laminate according to the present invention can be produced by any method known in the art. For example, the composite laminate can be produced by hot-pressing a sheet of a vibration damper comprising the above ethylene-(meth)acrylic acid salt copolymers, its modified products or compositions containing them, between substrates, or by adhering the sheet of the vibration damper between substrates using suitable adhesives. Alternatively, the composite laminate may be produced by extruding the molten vibration damper described above on a substrate and applying a further substrate onto the vibration damper with pressure. According to the present invention, since the vibration damper comprising the ethylene-(meth)acrylic acid salt copolymer having a specific range of melting point and heat of fusion, modified products thereof or compositions containing them is used as a vibration damper, the composite laminate for the vibration damping has excellent vibration damping performance, particularly at high temperatures, for example, at least 80° C., and is, for example, suitable for use in acoustic insulation or vibration insulation at the periphery of engines of automobiles, ships and the like.

The following non-limiting examples illustrate the composite laminate for the vibration damping according to the present invention.

EXAMPLE 1

Vibration Damper

An ethylene-sodium methacrylate copolymer (HI-MILAN ® manufactured by Mitsui Polychemical Industries, Ltd) having an ethylene content of 10 mole % as determined by a NMR method, and a melting point of 87° C. and a heat of fusion of 29 joules per gram as determined by means of a differential scanning calorimeter, was used as a vibration damper. The copolymer had a tensile strength at room temperature of 360 kg/cm² (according to ASTM D-882), and a loss factor (tan δ) at 85° C. of 0.55 (according to the Vibron method described above).

Manufacture of Composite Laminate and Evaluation of Vibration Damping Performance A composite laminate comprising iron plate/copolymer described above/iron plate (0.8 mm/0.1 mm/0.8 mm in thickness) was manufactured, and its vibration damping performance was evaluated. The results obtained are shown in Table. The copolymer and each iron plate were hot-pressed at a temperature of 190° C.

A vibration damping performance of the composite laminate was evaluated by vibration decay method under resonance condition using an apparatus which holds a specimen by two vertical cotton threads; as described in Journal of the Society of Rubber Industry, Vol. 51, pp 222(1978), and the loss factor of the composite laminate at 85° C. under 100 Hz was determined. The specimen was a composite laminate having a length of 300 mm, a width of 30 mm and a thickness of 1.7 mm.

COMPARATIVE EXAMPLES 1-9

Composite laminates were manufactured and their vibration damping performances were evaluated in the same manner as described in Example 1 except that copolymers shown in Table were used as the vibration dampers. The results obtained are shown in Table.

As can be seen from this Table, the composite laminate comprising of the vibration damper containing the ethylene-(meth)acrylic acid salt copolymer having a specific range of melting point and heat of fusion defined in the present invention has the extremely excellent loss factor as compared with that comprising of the vibration damper containing similar copolymers such as ethylene-butene copolymers, ethylene-(meta)acrylic acid copolymers, ethylene-ethylacrylate copolymers.

EXAMPLE 2

A composite laminate was manufactured and its vibration damping performance was evaluated in the same manner as described in Example 1 except that a modified polyolefin (Admer® QE 305 manufactured by Mitsui Petrochemical Industries, Ltd.) was added to the ethylene-sodium methacrylate copolymer in an amount of 10% by weight to improve the adhesion of HI-MILAN® to the metal substrate.

The copolymer containing the modified polyolefin had a melting point of 87° C., a heat fusion of 26 joules per gram and tan δ at 85° C. of 0.50.

A loss factor of the composite laminate at 100 Hz was 0.88.

EXAMPLE 3

A composite laminate is manufactrued and its vibration damping performance is evaluated in the same manner as described in Example 1 except that an inorganic fillers (calcium carbonate) is added to the ethylene-sodium methacrylate copolymer in an amount of 100 parts by weight based on 100 parts by weight of the ethylene-sodium methacrylate copolymer.

the heat of fusion of said copolymer being at least 20 joules per gram as determined by means of a differential scanning calorimeter.

2. The composite laminate of claim 1 in which the melting point of the copolymer is in the range of from 70° to 90° C.

3. The composite laminates of claim 1 in which the heat of fusion of the copolymer is in the range of from 20 to 40 joules per gram.

4. The composite laminates of claim 1 in which the vibration damper is composed of ethylene-sodium methacylate copolymers.

5. The composite laminate of claim 1 in which the laminate has a structure of metal plate/vibration damper/metal plate.

6. The composite laminate of claim 1 in which the vibration damper is composed of ethylene-(meth) acrylic acid salt copolymer and a modified polyolefin.

7. The composite laminate of claim 1 in which the vibration damper is composed of ethylene-(meth) acrylic acid salt copolymer and an inorganic filler.

8. The composite laminate of claim 1 in which the modified products of ethylene-(meth)acrylic acid salt copolymers are those modified products wherein unsaturated carboxylic acid selected from the group consisting of acrylic acid, methacrylic acid, methyl methacrylate, maleic acid, maleic anhydride, dimethyl maleate, itaconic acid, itaconic anhydride, citraconic acid, bicyclo [2.2.1] hept-2-ene-5,6-dicarboxylic acid and its anhydride; or derivatives of the unsaturated carboxylic acids

| | Copolymers for Vibration Damper | | | | | | |
|---|---|---|---|---|---|---|---|
| | Ethylene-α-Olefin Copolymers | α-Olefin Content (% by weight) | Melting Point[1] (°C.) | Heat of Fusion[2] (joule/g) | MFR (190° C.) (g/10 minutes) | Tensile Strength (Room Temperature) (kg/cm$^2$) | tanδ (85°) | Loss Factor of Composite Laminate (100 Hz) |
| Example 1 | Ethylene-Sodium Methacrylate | 18 | 87 | 29 | 0.9 | 360 | 0.55 | 0.9 |
| Comparative Example 1 | Ethylene-Butene-1 | 18 | 70 | 29 | 4 | 250 | 0.32 | 0.75 |
| Comparative Example 2 | Ethylene-Methacrylic Acid | 15 | 90 | 36 | 30 | 255 | 0.22 | 0.45 |
| Comparative Example 3 | Ethylene-Ethyl Acrylate | 25 | 85 | 35 | 6 | 150 | 0.22 | 0.45 |
| Comparative Example 4 | Ethylene-Butene-1 | 9 | 120 | 85 | 4 | 250 | 0.10 | 0.08 |
| Comparative Example 5 | Ethylene-Butene-1 | 50 | 50 | 10 | 1 | 30 | 0.15 | 0.15 |
| Comparative Example 6 | Ethylene-Methacrylic Acid | 7 | 105 | 70 | 20 | 280 | 0.11 | 0.08 |
| Comparative Example 7 | Ethylene-Methacrylic Acid | 40 | 55 | 10 | 20 | 50 | 0.15 | 0.15 |
| Comparative Example 8 | Ethylene-Sodium Methacrylate | 10 | 96 | 50 | 1 | 275 | 0.15 | 0.1 |
| Comparative Example 9 | Ethylene-Ethyl Acrylate | 10 | 100 | 80 | 5 | 180 | 0.15 | 0.1 |

Note:
[1] According to a differential scanning calorimeter
[2] Melt flow rate

What is claimed is:

1. A composite laminate comprising at least one metallic substrate and at least one vibration damper laminated thereon, said vibration damper being composed of at least one copolymer selected from the group consisting of ethylene-(meth)acrylic acid salt copolymers and modified products thereof, the melting point of said copolymer being in the range of from 60° to 90° C. and selected from acid anhydrides, salts and esters are grafted onto the ethylene-(meth)acrylic acid salt copolymer.

9. The composite laminate of claim 8 in which the melting point of the copolymer is in the range of from 70° to 90° C.

* * * * *